United States Patent Office 3,200,073
Patented Aug. 10, 1965

3,200,073
AGENTS TO IMPROVE YIELDS OF HYDROXY STEARATE GREASES
Dean W. Criddle, Pleasant Hill, Calif., assignor to California Research Corporation, San Francisco, Calif., a corporation of Delaware
No Drawing. Filed Dec. 31, 1962, Ser. No. 248,218
11 Claims. (Cl. 252—40.5)

This invention is directed to lubricating grease compositions having incorporated therein certain agents to improve the yields thereof. In particular, this invention is related to metal hydroxystearate thickened grease compositions having incorporated therein azelaic acid as a yield improving agent.

During the past few years, there has been a noticeable trend in the grease art to blend grease compositions which can be used for more than one purpose; that is, the usefulness of grease compositions has been extended to form multi-purpose greases. These multi-purpose lubricants are rapidly displacing special purpose grease compositions throughout all fields where greases are used, particularly in the field of industrial greases.

As a consequence of the rapid increase in the severity of operating conditions within industry, there is becoming an even greater demand for industrial grease compositions which are effective for the lubrication of wearing surfaces at high temperatures. Steel mill operations, particularly those which are used for the rolling of metals, require grease compositions having high melting points. One such operation in a steel mill involves the transformation of steel ingots into rods or sheets by passing the hot metal through the roll mill assembly for the purpose of reducing the cross-sectional area of the hot metal. The rolls through which the hot metal must pass are supported by bearings which are known in the industry as "roll-neck bearings." As is well known, it is an extremely expensive operation to shut down a mill for replacement of such bearings, particularly where the bearings fail due to failure of lubrication. Therefore, it is a prime requisite in roll mill operations that the lubricants withstand the effect of heavy duty service and provide proper lubrication at all times to prevent lubricating failures.

A primary factor to consider in the lubrication of antifriction "roll-neck bearings" is the extreme load to which the "roll-necks" must be subjected when hot metals are passing through the rolls. As the pressures under which the roll-neck bearings operate increase, there is a proportionate increase in the temperature of those bearings. Such high temperatures and extreme pressures often cause a breakdown of the prior-art grease compositions; for example, those greases which are thickened only with a metal soap of a fatty acid.

The grease art describes well the use of metal soaps of fatty acids, (e.g. calcium-hydroxystearate) as grease thickening agents, and the use of metal soaps of low molecular weight fatty acids, (e.g. calcium acetate) as modifying agents for such grease compositions. For example, U.S. Patent No. 2,842,495 teaches that grease compositions of high film strength are obtained by using large excesses of calcium acetate in combination with metal soaps of fatty acids.

In accordance with this invention, it has been discovered that improved yields and increased dropping points of grease compositions thickened by metal soaps of hydroxystearic acids are obtained by the use of dicarboxylic acids selected from the group consisting of azelaic acid and sebacic acid. Thus, the grease composition described herein contains as the primary thickening agent, a metal hydroxy stearate, and in combination therewith, azelaic acid or sebacic acid.

The grease compositions described herein can be used for numerous purposes, such grease compositions are particularly useful for steel mill motors, steel mill transfer table bearings, steel mill roller bearings, paper mill roller bearings, nuclear reactors, motor wheel bearings, bearings of amphibious military vehicles, high temperature extreme pressure equipment, exposed control surface bearings for aircraft, etc.

The primary grease thickening agents described herein are the metal hydroxy stearates, including the metals of Groups I and II of Mendeleff's Periodic Table, particularly the alkali metals and the alkaline earth metals, and more particularly, lithium and calcium.

Lubricating oils which are suitable herein as base oils for the compositions of this invention include a wide variety of lubricating oils, such as naphthenic base, paraffin base and mixed base, other hydrocarbon lubricants, e.g., lubricating oils derived from coal products, and synthetic oils, e.g. alkylene polymers (such as polymers of propylene, butylene, etc., and mixtures thereof), alkylene oxide-type polymers, dicarboxylic acid esters, liquid esters of acids of phosphorus, numerous alkyl benzenes, polymers of silicon, polyphenyls (e.g., biphenyls and terephenyls), alkyl biphenyl ethers, etc.

Synthetic oils of the alkylene oxide-type polymers which may be used include those exemplified by the alkylene oxide polymers (e.g., propylene oxide polymers) and derivatives, including alkylene oxide polymers prepared by polymerizing the alkylene oxide, e.g., propylene oxide in the presence of water or alcohols, e.g., ethyl alcohol, esters of ethylene oxide-type polymers, e.g., acetylated ethylene oxide polymers prepared by acetylating ethylene oxide polymers containing hydroxyl groups; polyethers prepared from ethylene glycols, e.g., ethylene glycol, etc.

Synthetic oils of the dicarboxylic acid ester type include those which are prepared by esterifying such dicarboxylic acids as adipic acid, azelaic acid, suberic acid, sebacic acid, alkanol succinic acid, fumaric acid, maleic acid, etc., with alcohols such as butyl alcohol, hexyl alcohol, 2-ethylhexyl alcohol, dodecyl alcohol, etc. Examples of dibasic (dicarboxylic) acid ester synthetic oils include dibutyl adipate, dihexyl adipate, di-2-ethylhexyl sebacate, and di-N-hexyl fumaric polymer.

Synthetic oils of the alkyl benzene type include those which are prepared by alkylating benzene (e.g., dodecyl benzene, tetradecyl benzene, etc.).

Synthetic oils of the types of polymers of silicon include the liquid esters of silicon and the polysiloxanes, which include those exemplified by tetraethyl silicate, tetraisopropyl silicate, tetra (4-methyl-2-penta) silicate, poly(methyl) siloxane, poly(methylphenyl) siloxane, etc.

The grease thickening agents herein are used in amounts sufficient to thicken the base oils to the consistency of greases; such amounts include from 1% to 30%, by weight, preferably from 5% to 15%, by weight.

The azelaic acid and sebacic acid are used in amounts of 0.1 to 10% by weight, preferably from 0.5% to 4% by weight.

The tables hereinbelow present data showing the effectiveness of azelaic acid and sebacic acid in improving the yields and dropping points of grease compositions thickened by metal soaps of hydroxystearic acids.

The dicarboxylic acids were blended into the grease compositons by heating the mixture at 250° F. for a period of 2 hours, following by cooling to room temperature.

The dropping points are the ASTM dropping points.

The penetration values are the unworked penetration ($P_0$) and the worked penetration after 60 strokes in the ASTM worker ($P_{60}$).

Table I

| | Composition (Base Oil plus) | | | Test Results | | |
|---|---|---|---|---|---|---|
| | Thickener | Wt. Percent | Carboxylic Acid | Wt. Percent | $P_0$ | $P_{60}$ | ASTM Dropping Point, °F. |
| (1) | | | Azelaic Acid | 11.5 | Fluid | Fluid | 100 |
| (2) | Lithium 12-OH Stearate | 9.5 | | | 277 | 304 | 355 |
| (3) | ___do___ | 9.5 | Azelaic Acid | 2.0 | 216 | 242 | 520 |
| (4) | ___do___ | 9.5 | Decanoic Acid | 2.0 | | 305 | 363 |
| (5) | ___do___ | 9.5 | Octanoic Acid | 2.0 | 288 | 325 | |
| (6) | Calcium 12-OH Stearate | 10.0 | | | 244 | 285 | 300 |
| (7) | ___do___ | 10.0 | Azelaic Acid | 2.0 | 239 | 266 | 454 |
| (8) | Lithium Stearate | 20.0 | | | 176 | 189 | 380 |
| (9) | ___do___ | 20.0 | Azelaic Acid | 2.0 | 213 | 269 | 397 |
| (10) | Lithium 12-OH Stearate | 9.5 | ___do___ | 0.0 | 314 | 306 | 355 |
| (11) | ___do___ | 7.9 | ___do___ | 1.6 | 288 | 312 | 520 |

The data set forth hereinbelow in Table II show the particular specific effectiveness of the azelaic and sebacic acids to improve the characteristics of grease compositions. The base grease contained 9.5% of lithium 12-hydroxy stearate. The dicarboxylic acids were mixed into the grease by hand, and the resulting grease was heated at 250° F. for 2 hours, cooled to room temperature and milled in an extrusion mill at 10,000 p.s.i.

Table II

| | Composition | Test Data | | |
|---|---|---|---|---|
| | | Worked Penetration ($P_{60}$) Samples Heated | | Dropping Point, °F. |
| | | 2 Hr. at 250° F. | 2 Hr. at 325° F. | |
| (1) | Base Grease | 304 | | 355 |
| (2) | +2% Oxalic Acid | 299 | 283 | 160 |
| (3) | +2% Malonic Acid | 300 | 272 | 160 |
| (4) | +2% Succinic Acid | 301 | 285 | 180 |
| (5) | +2% Succinic Anhydride | 298 | Fluid | 100 |
| (6) | +2% Adipic Acid | 297 | 261 | 360 |
| (7) | +2% Azelaic Acid | 256 | 259 | 520 |
| (8) | +2% Sebacic Acid | | | 570 |
| (9) | +2% Decanoic Acid | 305 | 381 | |

Table III hereinbelow further illustrates the effectiveness of azelaic acid on various grease compositions to improve the yields thereof. Grease A consisted of a California napthenic base oil thickened with 9.5% by weight of lithium 12-hydroxy-stearate.

Grease B consisted of a California naphthenic base oil thickened with 10.7% calcium 12-hydroxystearate.

Table III

| | Grease | Percent Azelaic Acid | Penetration | | Dropping Point, °F. |
|---|---|---|---|---|---|
| | | | $P_0$ | $P_{60}$ | |
| (1) | A | 0.0 | 277 | 304 | 355 |
| (2) | A | 2.0 | 216 | 242 | 520 |
| (3) | B | 0.0 | 238 | 285 | 300 |
| (4) | B | 2.0 | 210 | 241 | 454 |

In certain instances it may be desirable to add alkaline agents to make the grease composition neutral. The complex between the metal 12-hydroxystearate and the dibasic acids is not destroyed by the addition of certain alkaline agents to give a neutral product. For example, when 0.5% of either lime or triethylene tetramine were added to the complex, the dropping point and yield were retained.

In addition to the components noted hereinabove, the grease compositions herein may contain rust inhibitors, bleeding inhibitors, other thickening agents, extreme pressure agents, etc.

I claim:

1. A grease composition comprising an oil of lubricating viscosity in major amount, a metal soap of 12-hydroxystearic acid, wherein said metal is selected from the group consisting of the metals of Groups I and II of Mendeléeff's Periodic Table, in an amount to thicken said oil to the consistency of a grease, and from 0.1% to 10% by weight of a dicarboxylic acid selected from the group consisting of azelaic acid and sebacic acid.

2. A grease composition comprising an oil of lubricating viscosity in major amount, from 1% to 30% by weight of a metal soap of 12-hydroxystearic acid, and from 0.1% to 10% by weight of azelaic acid, wherein said metal is selected from the group consisting of the metals of Groups I and II of Mendeléeff's Periodic Table.

3. A grease composition comprising an oil of lubricating viscosity in major amount, from 1% to 30% by weight of a metal soap of 12-hydroxystearic acid, and from 0.1% to 10% by weight of sebacic acid, wherein said metal is selected from the group consisting of the metals of Groups I and II of Mendeléeff's Periodic Table.

4. A grease composition comprising an oil of lubricating viscosity in major amount, from 1% to 30% by weight of a metal soap of 12-hydroxystearic acid, and from 0.1% to 10% by weight of azelaic acid wherein said metal is lithium.

5. A grease composition comprising an oil of lubricating viscosity in major amount, from 1% to 30% by weight of a metal soap of 12-hydroxystearic acid, and from 0.1% to 10% by weight of sebacic acid, wherein said metal is lithium.

6. A grease composition comprising an oil of lubricating viscosity in major amount, from 5% to 15% by weight of a metal soap of 12-hydroxystearic acid, and from 0.5% to 4% by weight of a dicarboxylic acid selected from the group consisting of azelaic acid and sebacic acid, wherein said metal is selected from the group consisting of lithium and calcium.

7. The grease composition of claim 6 wherein said metal is lithium.

8. The grease composition of claim 6 wherein said metal is calcium.

9. A grease composition according to claim 1 wherein said dicarboxylic acid is present in amount of from 0.5 to 4 weight percent.

10. A grease composition according to claim 3 wherein said sebacic acid is present in amount of from 0.5 to 4 weight percent.

11. A grease composition according to claim 2 wherein said azelaic acid is present in amount of from 0.5 to 4 weight percent.

References Cited by the Examiner

UNITED STATES PATENTS

| 2,019,336 | 10/35 | Clark | 252—56 |
| 2,349,044 | 5/44 | Jahn | 252—56 |
| 2,452,320 | 10/48 | Kluge et al. | 252—50 |
| 3,076,763 | 2/63 | Nelson | 252—39 |

DANIEL E. WYMAN, *Primary Examiner.*